United States Patent
Zheng

(10) Patent No.: US 9,401,031 B2
(45) Date of Patent: Jul. 26, 2016

(54) METHOD AND MODULE FOR ACQUIRING POSITION INFORMATION OF TRANSFORM BLOCK

(71) Applicant: Huawei Technologies Co., Ltd., Shenzhen (CN)

(72) Inventor: Xiaozhen Zheng, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 253 days.

(21) Appl. No.: 14/082,313

(22) Filed: Nov. 18, 2013

(65) Prior Publication Data

US 2014/0079332 A1    Mar. 20, 2014

Related U.S. Application Data

(63) Continuation of application No. PCT/CN2012/080856, filed on Aug. 31, 2012.

(30) Foreign Application Priority Data

Aug. 31, 2011 (CN) .......................... 2011 1 0255252

(51) Int. Cl.
*G06T 9/00* (2006.01)
*H04N 19/176* (2014.01)
(Continued)

(52) U.S. Cl.
CPC .............. *G06T 9/007* (2013.01); *H04N 19/119* (2014.11); *H04N 19/122* (2014.11);
(Continued)

(58) Field of Classification Search
None
See application file for complete search history.

(56) References Cited

U.S. PATENT DOCUMENTS

2007/0206679 A1  9/2007  Lim et al.
2008/0291997 A1  11/2008  Yoon et al.
(Continued)

FOREIGN PATENT DOCUMENTS

CN      101019435 A     8/2007
CN      101686395 A     3/2010
(Continued)

OTHER PUBLICATIONS

Wien, M., et al., "16 Bit Adaptive Block Size Transforms," Joint Video Team (JVT) of ISO/IEC MPEG & ITU-T VCEG (ISO/IEC JTC1/SC29/WG11 and ITU-T SG16 Q.6), JVT-C107r1, XP030005217, 3rd Meeting: Fairfax, Virginia, May 6-10, 2002, 54 pages.

(Continued)

*Primary Examiner* — Phuoc Tran
(74) *Attorney, Agent, or Firm* — Conley Rose, P.C.; Grant Rodolph

(57) ABSTRACT

An embodiment of the present invention provides a method for acquiring position information of a transform block. The method includes: obtaining a splitting manner of an image block; obtaining splitting direction information according to the splitting manner of the image block and a splitting layer number of a transform block, or obtaining splitting direction information according to the splitting manner of the image block and a numerical relationship between a width and a height of a transform block; and obtaining position information of a post-splitting transform block according to the splitting direction information. In embodiments of the present invention, splitting direction information is obtained directly according to a splitting manner of an image block and a layer number, and then, size information of a transform block is coded according to the splitting direction information, thereby effectively reducing complexity of a coding process.

23 Claims, 7 Drawing Sheets

(51) Int. Cl.
*H04N 19/119* (2014.01)
*H04N 19/122* (2014.01)
*H04N 19/46* (2014.01)
*H04N 19/61* (2014.01)
*H04N 19/96* (2014.01)
*H04N 19/136* (2014.01)

(52) U.S. Cl.
CPC ........... *H04N 19/176* (2014.11); *H04N 19/136* (2014.11); *H04N 19/46* (2014.11); *H04N 19/61* (2014.11); *H04N 19/96* (2014.11)

(56) References Cited

U.S. PATENT DOCUMENTS

| 2013/0022107 A1* | 1/2013 | Van der Auwera | H04N 7/26117 375/240.03 |
| 2013/0156335 A1* | 6/2013 | Lim | G06T 9/004 382/238 |

FOREIGN PATENT DOCUMENTS

| JP | 2005159947 A | 6/2005 |
| WO | 2010116268 A1 | 10/2010 |

OTHER PUBLICATIONS

Cao, T., et al., "CE6.b1 Report on Short Distance Intra Prediction Method," Joint Collaborative Team on Video Coding (JCT-VC) of ITU-T SG16 WP3 and ISO/IEC JTC1/SC29/WG11, JCTVC-E278, XP030008784, 5th Meeting: Geneva, Mar. 16-23, 2011, 6 pages.

Yuan, Y., et al., "CE2: Non-Square Quadtree Transform for Symmetric and Asymmetric Motion Partition," Joint Collaborative Team on Video Coding (JCT-VC) of ITU-T SG16 WP3 and ISO/IEC JTC1/SC29/WG11, 6th Meeting: Torino, IT, JCTVC-F412, XP030049402, Jul. 14-22, 2011, 8 pages.

Zheng, X., et al., "Implementation of NSQT in HM," Joint Collaborative Team on Video Coding (JCT-VC) of ITU-T SG 16 WP 3 and ISO/IEC JTC1/SC 29/WG11, 9th Meeting: Geneva, CH, JCTVC-I0306, XP0300112069, Apr. 27-May 7, 2012, 6 pages.

Foreign Communication From a Counterpart Application, European Application No. 12826856.2, Extended European Search Report dated Apr. 17, 2014, 12 pages.

Foreign Communication From a Counterpart Application, PCT Application No. PCT/CN2012/080856, Chinese Search Report dated Dec. 6, 2012, 6 pages.

Foreign Communication From a Counterpart Application, PCT Application No. PCT/CN2012/080856, Written Opinion dated Dec. 6, 2012, 8 pages.

Wiegand, T., et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, 5th Meeting: Geneva, CH, Mar. 16-23, 2011, 233 pages.

* cited by examiner

2NxnU splitting

2NxnD splitting

2nLx2N splitting nRx2N splitting

METHOD AND MODULE FOR ACQUIRING POSITION INFORMATION OF TRANSFORM BLOCK

CROSS-REFERENCE TO RELATED APPLICATIONS

This application is a continuation of International Application No. PCT/CN2012/080856, filed on Aug. 31, 2012, which claims priority to Chinese Patent Application No. 201110255252.5, filed on Aug. 31, 2011, all of which are hereby incorporated by reference in their entireties.

TECHNICAL FIELD

The present invention relates to the field of communications technologies, and in particular, to a method and a module for acquiring position information of a transform block.

BACKGROUND

Multiple video compression methods may be used to compress video data in order to minimize a bandwidth required for transmitting the video data as much as possible. The video compression methods include intra-frame compression and inter-frame compression. Recently, an inter-frame compression method based on motion estimation is often used. Specifically, a process in which a coding end of an image uses the inter-frame compression method to compress and code the image includes: splitting, by the coding end, a to-be-coded image block into several image sub-blocks of a same size; for each image sub-block, searching a reference image for an image block that best matches a current image sub-block and using the image block as a prediction block; subtracting a pixel value of each pixel of the prediction block from a pixel value of each corresponding pixel of the current image sub-block to obtain a residual; performing entropy coding on a value obtained after the residual is transformed and quantified; and finally sending a bit stream and motion vector information that are obtained through the entropy coding to a decoding end, where the motion vector information indicates a position difference between the current image sub-block and the prediction block. After obtaining the bit stream obtained through the entropy coding, the decoding end of the image first performs entropy decoding to obtain the corresponding residual and the corresponding motion vector information; obtains the corresponding matched image block (that is, the prediction block) from the reference image according to the motion vector information; and then adds a value of each pixel point in the matched image block and a value of a corresponding pixel point in the residual to obtain a value of each pixel point in the current image sub-block. The intra-frame prediction is to utilize information inside a current image to predict an image block to obtain a prediction block. The coding end obtains a corresponding pixel of the prediction block according to a prediction mode, a prediction direction, and pixel values around the image block, and subtracts the pixel of the prediction block from a pixel of the image block to obtain a residual, where the residual is written into a code stream after undergoing transform, quantification, and entropy coding; and the decoding end parses the code stream, obtains a residual block after performing entropy decoding, de-quantification, and de-transform on the code stream, obtains the prediction block according to the prediction mode, the prediction direction, and the pixel values around the image block, and adds a pixel of the residual block and the pixel of the prediction block to obtain a reconstructed image block.

Concepts of a coding unit, a prediction unit, and a transform unit exist in a current video coding and decoding standard. The coding unit is an image block operated when a coding end performs coding or a decoding end performs decoding. The prediction unit is an image block that has an independent prediction mode in the coding unit. One prediction unit may include multiple prediction blocks, where a prediction block is an image block operated when a coding unit performs a prediction operation. The transform unit is an image block operated when a coding unit performs a transform operation, and may also be called a transform block. Considering that different signals inside a prediction block are strongly correlated, large-block transform brings higher energy concentration performance than small-block transform. In a broader sense, one image block may include one or more prediction blocks, and prediction is performed by using a prediction block as a unit at the coding and decoding ends; and meanwhile, one image block includes one or more transform blocks, and transform is performed by using a transform block as a unit at the coding and decoding ends.

In an existing video coding and decoding process, one image block, which is also called a macroblock, a super-macroblock, or the like, is split into several image sub-blocks. Sizes of these image sub-blocks may be 64×64, 64×32, 32×64, 32×32, 32×16, 16×32, 16×16, 16×8, 8×16, 8×8, 8×4, 4×8, 4×4, and the like. Pixel prediction, motion estimation, and motion compensation are performed by using these image sub-blocks as a unit for the image block. Accordingly, the coding end of the image sends information of a splitting manner of the image block in a code stream to the decoding end of the image, so that the decoding end of the image learns a splitting manner at the coding end of the image, and performs a corresponding decoding operation according to the splitting manner. In an existing video coding and decoding standard, each of these image sub-blocks is an N×M rectangular block (both N and M are an integer greater than 0), and N and M are in a multiple relationship.

In an existing video coding and decoding technology, a transform matrix may be used to remove redundant information of the image block, so as to improve coding efficiency. Generally, two-dimensional transform is used for transform of a data block in an image block. That is, the coding end multiplies residual information of the data block, one N×M transform matrix, and a transpose matrix of the N×M transform matrix to obtain a transform coefficient. The preceding step may be described by using the following formula:

$$f = T' \times C \times T$$

where C represents residual information of a data block, T and T' represent a transform matrix and a transpose matrix of the transform matrix, and f represents a transform coefficient matrix obtained after the residual information of the data block is transformed. The transform matrix may be a discrete cosine transform (DCT) matrix, an integer transform matrix, a Karhunen Lóeve Transform (KLT) matrix, or the like. KLT may better consider texture information of an image block or an image block residual, and therefore, using KLT may achieve a better effect.

Performing the preceding processing on the residual information of the image block is equivalent to transforming the residual information of the image block from a space domain to a frequency domain, and the transform coefficient matrix f is obtained after the processing is concentrated in a low-frequency area. After performing the preceding transform on the residual information of the image block, the coding end performs processing such as quantification and entropy coding on the transform coefficient matrix obtained after the transform, and sends a bit stream obtained through the entropy coding to the decoding end. To enable the decoding end to learn a type and a size of a transform matrix used at the coding end, generally the coding end sends indication information that represents a transform matrix used by a current image block to the decoding end.

Subsequently, the decoding end determines, according to the indication information, the transform matrix used at the coding end; decodes, according to a characteristic (such as orthogonality of the transform matrix) of the transform matrix, the bit stream sent by the coding end to obtain the transform coefficient matrix; multiplies the transform coefficient matrix and the transform matrix and the transpose matrix of the transform matrix, to restore and obtain residual information of a data block that is approximately consistent with that of the coding end. The preceding step may be described by using the following formula:

$$C = T \times f \times T'$$

where C represents residual information of a data block, T and T' represent a transform matrix and a transpose matrix of the transform matrix, and f represents a transform coefficient matrix obtained by the decoding end.

Because different regularities of distribution may exist for a residual of an image block, a good transform effect often cannot be achieved by using a transform matrix of a specific size. Therefore, in the prior art, it is attempted to use transform matrices (also called transform blocks) of different sizes for the residual of the image block. For this reason, for a 2N×2N image block, a transform matrix whose size is 2N×2N may be used, or transform matrices whose sizes are N×N or transform matrices whose sizes are 0.5N×0.5N may be used.

However, currently only a transform matrix of a square size is used. For striped texture that frequently occurs, a transform matrix of a square (square) size cannot effectively remove redundant information of an image block. Therefore, performing coding by using a non-square (non-square or rectangular) transform matrix occurs. However, the non-square transform matrix increases coding complexity. In order to code position information of a transform block, repetitive conversion is required for splitting an image block and a code block, thereby increasing complexity of a coding process.

SUMMARY

An embodiment of the present invention provides a method for acquiring position information of a transform block. The method includes: obtaining a splitting manner of an image block; obtaining splitting direction information according to the splitting manner of the image block and a splitting layer number of a transform block; and obtaining position information of a post-splitting transform block according to the splitting direction information.

An embodiment of the present invention further provides a method for acquiring position information of a transform block. The method includes: obtaining splitting direction information according to information of a transform block and a splitting manner of an image block, where the information of the transform block includes a width of the transform block and a height of the transform block; and obtaining position information of a post-splitting transform block according to the splitting direction information.

Accordingly, an embodiment of the present invention further provides a module for acquiring position information of a transform block. The module includes: a splitting manner obtaining module, configured to obtain a splitting manner of an image block; a splitting direction information obtaining module, configured to obtain splitting direction information according to the splitting manner of the image block and a splitting layer number of a transform block; and a position information obtaining module, configured to obtain position information of a post-splitting transform block according to the splitting direction information; or the module includes: a splitting manner obtaining module, configured to obtain a splitting manner of an image block; a splitting direction information obtaining module, configured to obtain splitting direction information according to a numerical relationship between a width and a height of a transform block and the splitting manner of the image block, or obtain splitting direction information according to a numerical relationship between a width and a height of a transform block; and a position information obtaining module, configured to obtain position information of a post-splitting transform block according to the splitting direction information.

In the method and the module for acquiring position information of a transform block provided in the embodiments of the present invention, splitting direction information is obtained according to a splitting manner of an image block and a layer number, and then, size information of a transform block is coded according to the splitting direction information, thereby effectively reducing complexity of a coding process.

BRIEF DESCRIPTION OF DRAWINGS

To illustrate the technical solutions in the embodiments of the present invention more clearly, the following briefly introduces accompanying drawings required for describing the embodiments or the prior art. The accompanying drawings in the following description show merely some embodiments of the present invention, and a person of ordinary skill in the art may still derive other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. The embodiments to be described are merely a part rather than all of the embodiments of the present invention. All other embodiments obtained by a person of ordinary skill in the art based on the embodiments of the present invention without creative efforts shall fall within the protection scope of the present invention.

FIG. 1A to FIG. 1D are schematic diagrams of examples of a symmetrical splitting manner of an image block.

Figure 1A:
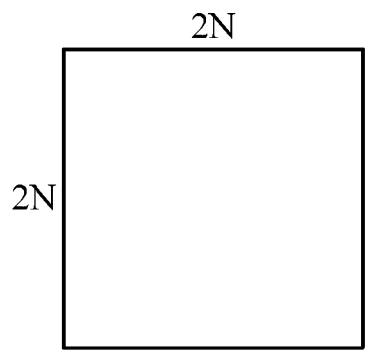
FIG. 1A to FIG. 1D are schematic diagrams of examples of a symmetrical splitting manner of an image block.
Figure 1B:
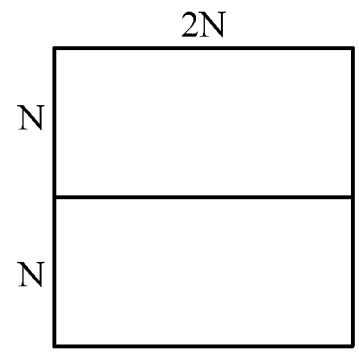
Figure 1C:
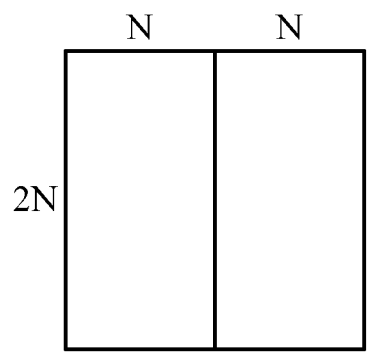
Figure 1D:
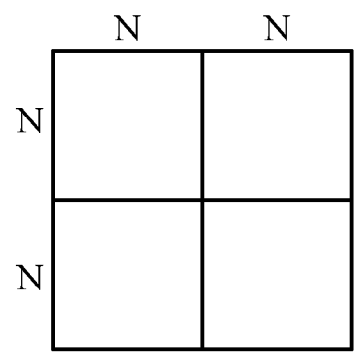

Common manners of splitting an image block into an image sub-block are as follows: a 2N×2N splitting manner, in which an image block includes only one image sub-block, that is, the image block is not split into smaller image sub-blocks, as shown in FIG. 1A; a 2N×N splitting manner, in which an image block is split into one upper image sub-block and one lower image sub-block that are of a same size, as shown in FIG. 1B; an N×2N splitting manner, in which an image block is split into one left image sub-block and one right image sub-block that are of a same size, as shown in FIG. 1C; and an N×N splitting manner, in which an image block is split into four image sub-blocks of a same size, as shown in FIG. 1D. N is any positive integer and indicates the number of pixels.

FIG. 2A to FIG. 2D are schematic diagrams of examples of an asymmetrical splitting manner of an image block.

An asymmetrical splitting manner may also be applied to an image block, as shown in FIG. 2A to FIG. 2D. In splitting manners shown in FIG. 2A and FIG. 2B, one image block is split into one upper rectangular image sub-block and one lower rectangular image sub-block that are of different sizes. In two image sub-blocks obtained through splitting in a 2N×nU splitting manner (in the figure, n=0.5 N) shown in FIG. 2A, lengths of two sides of an upper image sub-block are 2N and 0.5N, and lengths of two sides of a lower image sub-block are 2N and 1.5N. Generally, in 2N×nU, U indicates that an image splitting line shifts upward to a midnormal of the image block. 2N×nU indicates that the image splitting line shifts upward by n to the midnormal of the image block, where n=x×N and x is greater than or equal to 0 and smaller than or equal to 1.

Figure 2A:
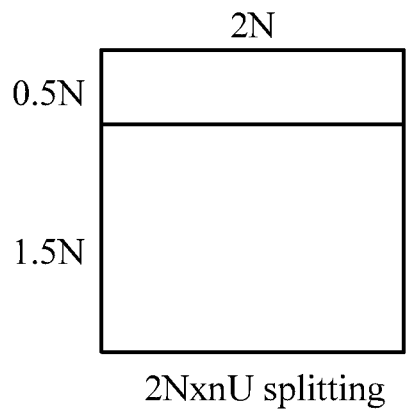
FIG. 2A to FIG. 2D are schematic diagrams of examples of an asymmetrical splitting manner of an image block.
Figure 2B:
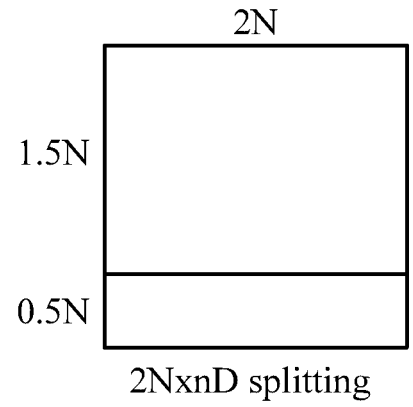

In two image sub-blocks obtained through splitting in a 2N×nD splitting manner (in the figure, n=0.5 N) shown in FIG. 2B, lengths of two sides of an upper image sub-block are 2N and 1.5N, and lengths of two sides of a lower image sub-block are 2N and 0.5N. Generally, in 2N×nD, D indicates that an image splitting line shifts downward to a midnormal of the image block. 2N×nD indicates that the image splitting line shifts downward by n to the midnormal of the image block, where n=x×N and x is greater than or equal to 0 and smaller than or equal to 1.

Figure 2C:
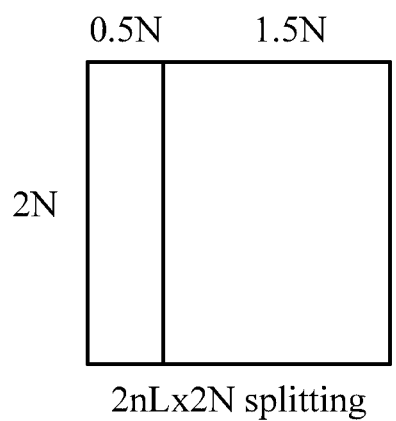
Figure 2D:
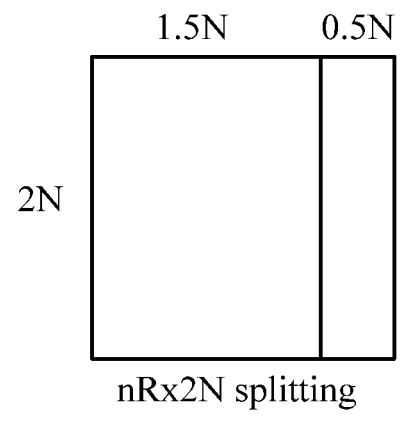

In splitting manners shown in FIG. 2C and FIG. 2D, one image block is split into one left rectangular image sub-block and one right rectangular image sub-block of different sizes. In two image sub-blocks obtained through splitting in an nL×2N splitting manner (in the figure, n=0.5 N) shown in FIG. 2C, lengths of two sides of a left image sub-block are 0.5N and 2N, and lengths of two sides of a right image sub-block are 1.5N and 2N. Generally, in nL×2N, L indicates that an image splitting line shifts leftward to a midnormal of the image block. nL×2N indicates that the image splitting line shifts leftward by n to the midnormal of the image block, where n=x×N and x is greater than or equal to 0 and smaller than or equal to 1.

In two image sub-blocks obtained through splitting in an nR×2N splitting manner (in the figure, n=0.5 N) shown in FIG. 2D, lengths of two sides of a left image sub-block are 1.5N and 2N, and lengths of two sides of a right image sub-block are 0.5N and 2N. Generally, in nR×2N, R indicates that an image splitting line shifts rightward to a midnormal of the image block. nR×2N indicates that the image splitting line shifts rightward by n to the midnormal of the image block, where n=x×N and x is greater than or equal to 0 and smaller than or equal to 1.

The preceding image block splitting manners may also be represented by using prediction block types. 2N×2N, 2N×N, N×2N, 2N×nU, 2N×nD, nL×2N, and nR×2N all represent prediction block types corresponding to the image block splitting manners.

Among the preceding image block splitting manners, a splitting manner of splitting an image block or a transform block by a horizontal splitting line into multiple image sub-blocks or transform blocks or prediction blocks that are arranged along a vertical direction is a horizontal splitting manner, and a splitting direction used in this case is a horizontal splitting direction. The 2N×N splitting manner, the 2N×nU splitting manner, and the 2N×nD splitting manner are collectively referred to as a horizontal splitting manner; while a splitting manner of splitting an image block or a transform block by a vertical splitting line into multiple image sub-blocks or transform blocks or prediction blocks that are arranged along a horizontal direction is a vertical splitting manner, and a splitting direction used in this case is a vertical splitting direction. The N×2N splitting manner, the nL×2N splitting manner, and the nR×2N splitting manner are collectively referred to as a vertical splitting manner; and a splitting manner of splitting an image block or a transform block by a vertical splitting line into four image sub-blocks or transform blocks or prediction blocks is a horizontal and vertical splitting manner, and a splitting direction used in this case is a horizontal and vertical splitting direction. The N×N splitting manner is a horizontal and vertical splitting manner.

Figure 3A:
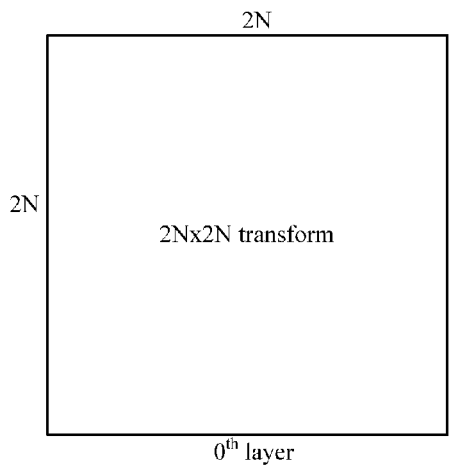
FIG. 3A to FIG. 3C are schematic diagrams of transform blocks corresponding to different layer numbers.
Figure 3B:
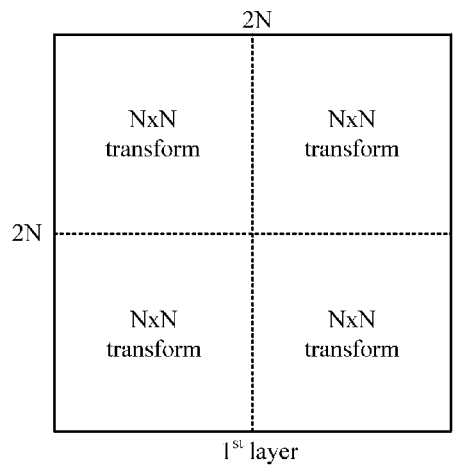
Figure 3C:
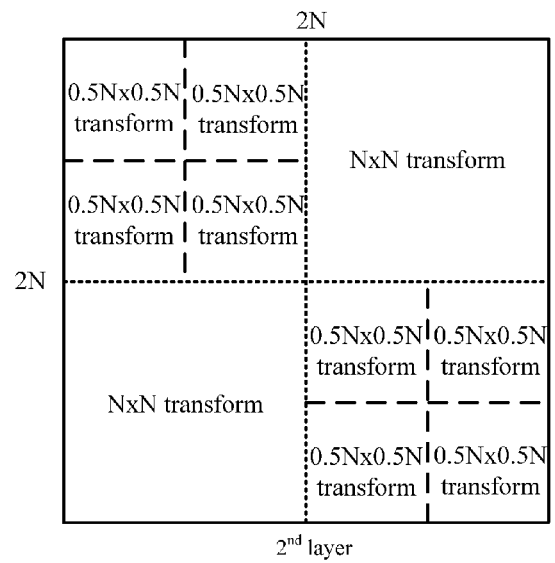

To effectively represent how transform matrices of different sizes are used for an image block, a tree identification method may be used to identify a transform block layer by layer. In the layer-by-layer identification method, first identification information corresponding to a transform block is determined, and then, whether to split the transform block into transform blocks of a smaller size is determined according to the identification information. FIG. 3A to FIG. 3C are schematic diagrams of transform blocks corresponding to different layer numbers.

As shown in FIG. 3A to FIG. 3C, during identification of a size of a transform block used by an image block, a code stream at a coding end is set with an indicator bit (identification information) used to identify whether a transform matrix whose size is 2N×2N is used in a $0^{th}$ splitting layer of the transform block. If the transform matrix whose size is 2N×2N (as shown in FIG. 3A) is used by the transform block, the indicator bit is 0. If 2N×2N transform is not used by the transform block, the indicator bit is 1, indicating that the transform matrix whose size is 2N×2N needs to be further split into four transform matrices whose sizes are N×N, and four bits are used in the code stream to respectively identify whether to further split each transform matrix whose size is N×N in a $1^{st}$ splitting layer. If a transform structure shown in FIG. 3B is used by the transform block, all four bits are 0, indicating that each transform matrix whose size is N×N is not further split.

When a transform structure shown in FIG. 3C is used, two of the four bits are 0 and the rest two bits are 1. The two bits being 0 indicate that a lower left transform matrix and an upper right transform matrix whose sizes are N×N are not further split. The rest two bits being 1 indicate that an upper left transform matrix and a lower right transform matrix whose sizes are N×N need to be further split to obtain transform matrices whose sizes are 0.5N×0.5N. In this case, the transform block corresponds to a $3^{rd}$ splitting layer. Then, four bits are used in the code stream to indicate whether upper left transform matrices whose sizes are 0.5N×0.5N need to be further split in a second layer structure; and four bits are used to indicate whether lower right transform matrices whose sizes are 0.5N×0.5N need to be further split. If the transform structure shown in FIG. 3C is used by the transform block, all the 4+4 bits are 0, indicating that further splitting is not performed. The layer-by-layer identification in the code stream may effectively and flexibly represent sizes of transform blocks used by the image block and the image sub-blocks.

A layer-by-layer identification method at a decoding end is a reverse process of that at the coding end. For example, first an indicator bit (identification information), which is used to identify whether a transform matrix whose size is 2N×2N is used in a $0^{th}$ splitting layer of the transform block and is in a code stream, is decoded. If a value of the indicator bit is 0, it indicates that 2N×2N transform and the structure shown in FIG. 3A are used by the transform block; if the indicator bit is 1, it indicates that the transform matrix whose size is 2N×2N needs to be further split into four transform matrices whose sizes are N×N, and the code stream continues to be decoded to obtain four bits which respectively indicate whether to further split each transform matrix whose size is N×N. If all four bits are 0, it indicates that each transform matrix whose size is N×N is not further split and the structure shown in FIG. 3B is used; if two bits of the four bits are 0 and the rest two bits are 1, the structure shown in FIG. 3C is used.

In the layer-by-layer identification method, a splitting layer corresponding to a transform block is used to identify a number of the splitting layer where the transform block is located. Generally, a size of a transform block corresponding to the $0^{th}$ splitting layer of the transform block is consistent with a size of the image block or a size of a prediction block, or is a specific block size.

In addition to the preceding method for identifying a layer number and a size that correspond to a transform block layer by layer, there is also a method for determining a size of a transform block according to a prediction block type used by an image block. Different prediction block types correspond to different image block splitting manners, and a prediction block may be obtained according to a splitting manner of an image block. For example, the 2N×N splitting manner indicates that a size of a corresponding prediction block is 2N×N (as shown in FIG. 1B).

In a video coding and decoding technology, usually leap transform exists for residual data corresponding to boundaries of two prediction blocks. Therefore, if a transform matrix crosses the boundaries of the two prediction blocks, a transform effect is weakened; correlation of a residual of an image block cannot be effectively removed; redundant information of the image block cannot be effectively removed; and coding efficiency is lowered.

In addition, in the prior art, a size of a transform matrix is not correlated to a size of a prediction block. As shown in FIG. 1B, when the 2N×N splitting manner is applied to a 2N×2N image block, because a splitting manner reflects texture information of an area where an image block is located, texture of the area where the image block is located tends more to have a horizontal texture characteristic, but N×N transform blocks are still used by the image block.

Because a size of a transform matrix is not correlated to a size of a prediction block, the transform matrix does not utilize information of the prediction block to effectively remove redundant information of the image block, thereby affecting coding efficiency. In an embodiment of the present invention, during determination of a size of a transform block, a transform block of an appropriate splitting manner is used, thereby improving image compression efficiency.

In the present invention, a splitting direction of a transform block is obtained according to a splitting layer number of the transform block and a splitting manner of an image block, thereby obtaining position information of a post-splitting transform block, or obtaining a splitting direction of the transform block according to splitting information of the transform block and the splitting manner of the image block; corresponding residual data is obtained at a coding end according to the position information of the post-splitting transform block, and then the residual data is transformed; and residual data is obtained after inverse transform is performed at a decoding end, and a decoded image block is obtained according to the position information of the post-splitting transform block and the residual data. In the present invention, when the splitting direction of the transform block is obtained, the splitting manner of the image block, the splitting layer number of the transform block, and the splitting information of the transform block are considered, so as to obtain the splitting direction of the transform block. A shape of a prediction block and texture information of the prediction block are considered in a size parameter and a position parameter of the post-splitting transform block, thereby improving coding efficiency. In addition, a position parameter of a filtering boundary of the post-splitting transform block may be further set according to the splitting direction of the transform block, thereby more accurately setting a filtering boundary of the transform block and improving the coding efficiency.

Figure 4:
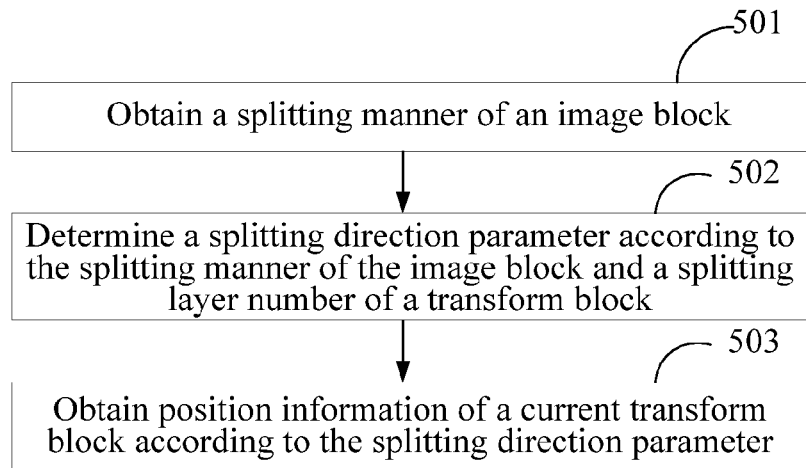
FIG. 4 is a method for acquiring position information of a transform block according to an embodiment of the present invention.

FIG. 4 is a method for acquiring position information of a transform block according to an embodiment of the present invention. The method includes:

501: Obtain a splitting manner of an image block.

Alternatively, in an embodiment, a splitting layer number used to identify a transform block is trafoDepth. When a transform block matrix of only one size is used by the transform block, the value of trafoDepth is 0.

During determination of a splitting direction, considering that the preceding transform block should not cross a boundary of a prediction block and a size of the transform block should be correlated to a size of the prediction block. A basic principle of determining the splitting direction is as follows: when a manner of splitting an image block along a horizontal direction shown in FIG. 1B, FIG. 2A, or FIG. 2B is applied to the image block, the splitting direction should be a vertical direction, that is, a transform block obtained through splitting is of a horizontal stripe shape, and this splitting manner may ensure that the transform block does not cross a boundary of a prediction block, and shape and texture information of the prediction block are considered; when a manner of splitting an image block along a vertical direction shown in FIG. 1C, FIG. 2C, or FIG. 2D is applied to the image block, the splitting direction should be a horizontal direction, that is, a transform block obtained through splitting is of a vertical stripe shape, and this splitting manner may ensure that the transform block does not cross a boundary of a prediction block and the shape and texture information of the prediction block are considered; when a manner of splitting an image block along a horizontal and vertical direction shown in FIG. 1D, the splitting direction should be a horizontal and vertical direction, that is, the transform block is split into four transform blocks; and if a current transform block needs to be further split into four smaller transform blocks, the splitting direction should be the horizontal and vertical direction.

502: Determine a splitting direction parameter according to the splitting manner of the image block and the splitting layer number of the transform block.

It is assumed that the splitting direction parameter is interTUSplitDirection.

When a splitting layer number of the current transform block is 0 and the image block is split into two prediction blocks along the vertical direction, the splitting direction parameter is 1, that is, interTUSplitDirection is equal to 1, and the splitting direction of the transform block is the horizontal splitting direction. In this case, the current transform block is split into sub-transform blocks that are arranged along the horizontal direction, the sub-transform blocks are post-splitting transform blocks, and a width or a height of a sub-transform block is smaller than a width or a height of a pre-splitting transform block; when the splitting layer number of the current transform block is 0 and the image block is split into two prediction blocks along the horizontal direction, the splitting direction parameter is 0, that is, a value of interTUSplitDirection is equal to 0, and the splitting direction of the transform block is the vertical splitting direction. In this case, the current transform block is split into sub-transform blocks that are arranged along the vertical direction, the sub-transform blocks are post-splitting transform blocks, and a width or a height of a sub-transform block is smaller than a width or a height of a pre-splitting transform block; when the splitting layer number of the current transform block is greater than 0 and the image block is split into two prediction blocks along the vertical direction or the image block is split into two prediction blocks along the horizontal direction, and both a width and a height of the transform block are greater than a preset minimum size, the splitting direction parameter is 2, that is, a value of interTUSplitDirection is 2, and the splitting direction of the transform block is the horizontal and vertical splitting direction. The current transform block is split by both a horizontal splitting line and a vertical splitting line into four sub-transform blocks, the sub-transform blocks are post-splitting transform blocks, and a width or a height of a sub-transform block is smaller than a width or a height of a pre-splitting transform block.

When the splitting layer number of the current transform block is greater than 0 and the image block is split into two prediction blocks along the vertical direction or the image block is split into two prediction blocks along the horizontal direction, and a width of the current transform block is equal to the preset minimum size, the current transform block is split into four sub-transform blocks along the vertical direction and the splitting direction parameter is set to 0, that is, a value of interTUSplitDirection is 0.

When the splitting layer number of the current transform block is greater than 0 and the image block is split into two prediction blocks along the vertical direction or the image block is split into two prediction blocks along the horizontal direction, and a height of the current transform block is equal to the preset minimum size, the current transform block is split into four sub-transform blocks along the horizontal direction and the splitting direction parameter is set to 1, that is, the value of interTUSplitDirection is 1.

The following describes this embodiment of the present invention in more detail with reference to specific examples and by using a coding end as an example. For ease of description, it is assumed that a splitting direction parameter is interTUSplitDirection. It should be understood that both the coding end and a decoding end determine position information of a current transform block according to a same or similar parameter and condition.

Figure 5A:
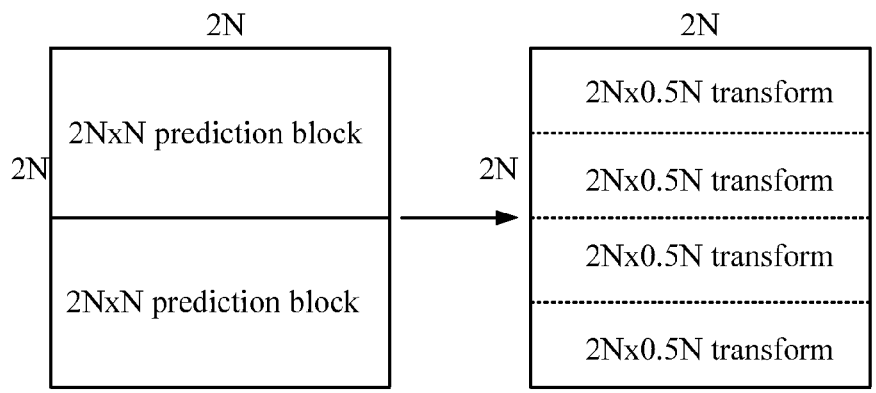
FIG. 5A and FIG. 5B are schematic diagrams of transform blocks according to an embodiment of the present invention.
Figure 5B:
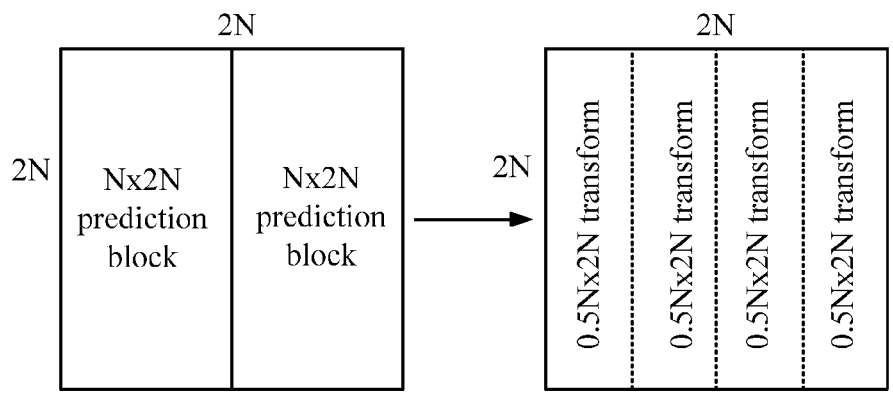

FIG. 5A and FIG. 5B are schematic diagrams of transform blocks according to an embodiment of the present invention.

In this embodiment, when only one layer of code is used by the transform block, that is, when only one fixed transform block size is used by an image block for coding, a value of trafoDepth is 0.

As shown in FIG. 5A, a splitting manner of an image block is 2N×N. Because only one layer of code is used by the transform block, in this case, a splitting direction is a vertical direction and a value of interTUSplitDirection is set to 0.

As shown in FIG. 5B, a splitting manner of an image block is N×2N. Because only one layer of code is used by the transform block, in this case, a splitting direction is a horizontal direction and a value of interTUSplitDirection is set to 1.

In another embodiment, a coding manner of three-layer splitting is used by a transform block, that is, a value of trafoDepth may be 0, 1, or 2. It is assumed that size parameters of a transform block corresponding to a specific splitting layer are log 2TrafoHeight and log 2TrafoWidth, where log 2TrafoHeight indicates that a height of the transform block is 1<<log 2TrafoHeight and log 2TrafoWidth indicates that a width of the transform block is 1<<log 2TrafoWidth. In addition, the size parameters of the transform block may also be represented by using log 2TrafoSize. A relationship between log 2TrafoSize, log 2TrafoHeight, and log 2TrafoWidth is log 2TrafoSize=(log 2TrafoHeight+log 2TrafoHeight)>>1.

Figure 6:
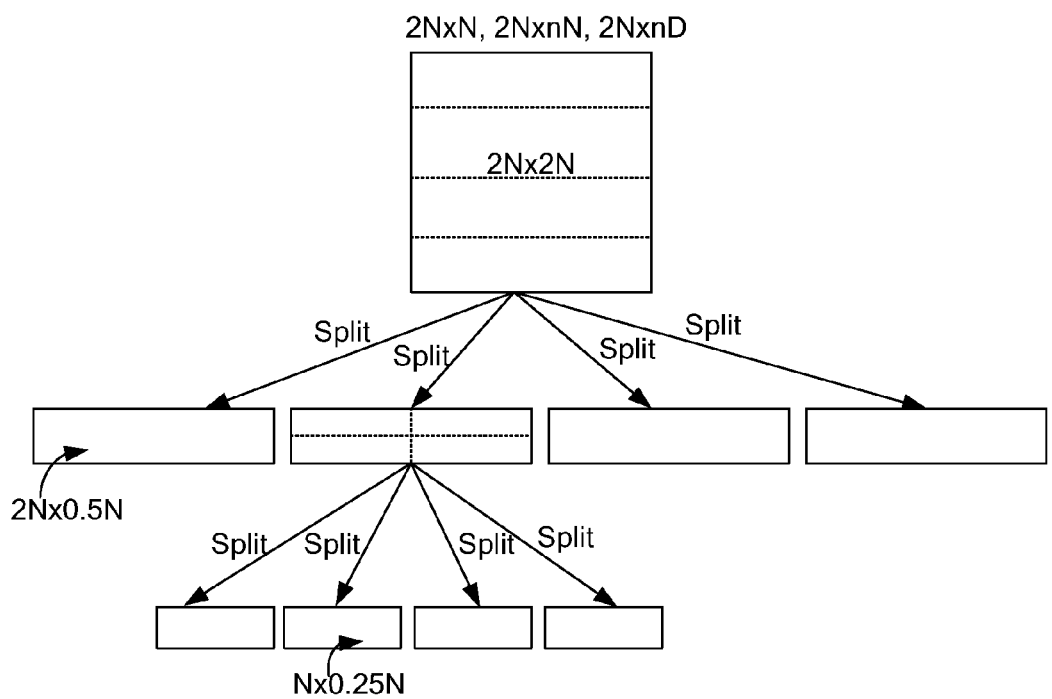
FIG. 6 and FIG. 7 are schematic diagrams of transform blocks according to an embodiment of the present invention.

As shown in FIG. 6, when the splitting manner of the image block is 2N×N, 2N×nU, or 2N×nD, a $0^{th}$ layer (trafoDepth is equal to 0) corresponding to the transform block uses a transform block that is consistent with a size of the image block. A purpose lies in that: when residual data corresponding to the image block is relatively small, using a greater transform block may improve coding efficiency. In this case, when it is determined that the transform block needs to be split from the $0^{th}$ layer (trafoDepth is equal to 0) to a $1^{st}$ layer (trafoDepth is equal to 1), according to the preceding principle, in this case, the splitting direction is the vertical direction and the value of interTUSplitDirection is 0, that is, the transform block is split into four transform blocks of a smaller size along the vertical direction, a width of each transform block is consistent with that of a transform block of the $0^{th}$ layer, and a height of each transform block is one fourth of that of a transform block of the $0^{th}$ layer. When it is determined that a transform blocks need to be split from the $1^{st}$ layer (trafoDepth is equal to 1) to a $2^{nd}$ layer (trafoDepth is equal to 2), because a transform block is always split by using a one-into-four rule and according to the preceding principle of correlating a size of a transform block to a size of a prediction block (a shape of the transform block may be consistent with that of the prediction block as much as possible), in this case (trafoDepth is equal to 1 and the splitting manner of the image block is one of 2N×N, 2N×nU, and 2N×nD), the splitting direction is the horizontal and vertical direction and the value of interTUSplitDirection is 2, that is, a transform block is split into four stripes of a smaller size along the horizontal direction, and a width and a height of each transform block are half of a width and half of a height of a transform block in the $1^{st}$ layer.

When the splitting manner of the image block is N×2N, nL×2N, or nR×2N, similar to the principle shown in FIG. 6, the $0^{th}$ layer (trafoDepth is equal to 0) corresponding to the transform block uses a transform block that is consistent with the size of the image block. A purpose lies in that: when residual data corresponding to the image block is relatively small, using a greater transform block may improve coding efficiency.

When it is determined that the transform block needs to be split from the $0^{th}$ layer (trafoDepth is equal to 0) to the $1^{st}$ layer (trafoDepth is equal to 1), according to the preceding principle, in this case, the splitting direction is the horizontal direction and the value of interTUSplitDirection is 1, that is, the transform block is split into four transform blocks of a smaller size along the horizontal direction, a height of each transform block is consistent with that of a transform block of the $0^{th}$ layer, and a width of each transform block is one fourth of that of a transform block of the $0^{th}$ layer. When it is determined that a transform block needs to be split from the $1^{st}$ layer (trafoDepth is equal to 1) to the $2^{nd}$ layer (trafoDepth is equal to 2), because a transform block is always split by using a one-into-four rule and according to the preceding principle of correlating a size of a transform block to a size of a prediction block, in this case (trafoDepth is equal to 1 and the splitting manner of the image block is one of N×2N, nL×2N, and nR×2N), the splitting direction is the horizontal and vertical direction and the value of interTUSplitDirection is 2, that is, the transform block is split into four stripes of a smaller size along the vertical direction, and a width and a height of each transform block are half of a width and half of a height of a transform block in the $1^{st}$ layer.

In another embodiment, a coding manner of three-layer splitting is used by a transform block, that is, a value of trafoDepth may be 0, 1, or 2. It is assumed that size parameters of a transform block corresponding to a specific splitting layer are log 2TrafoHeight and log 2TrafoWidth, where log 2TrafoHeight indicates that a height of the transform block is 1<<log 2TrafoHeight and log 2TrafoWidth indicates that a width of the transform block is 1<<log 2TrafoWidth. In addition, the size parameters of the transform block may also be represented by using log 2TrafoSize. A relationship between log 2TrafoSize, log 2TrafoHeight, and log 2TrafoWidth is log 2TrafoSize=(log 2TrafoHeight+log 2TrafoHeight)>>1. Furthermore, a minimum transform block size for use by a coder of an image is regulated. In this embodiment, it is regulated that the minimum transform block size that may be used by the coder is 4, and it is assumed that the size of the image block is 16×16.

As shown in FIG. 6, the splitting manner of the image block is one of 2N×N, 2N×nU, and 2N×nD, and the horizontal splitting manner is used by the image block. When the transform block is located in a $0^{th}$ layer (trafoDepth is equal to 0), a size of the transform bock is 16×16. When it is determined that the transform block needs to be split from the $0^{th}$ layer (trafoDepth is equal to 0) to a $1^{st}$ layer (trafoDepth is equal to 1), according to the preceding principle, in this case, the splitting direction is the vertical direction and the value of interTUSplitDirection is 0 and then a size of a transform block in the $1^{st}$ layer is 16×4. When it is determined that a transform block needs to be split from the $1^{st}$ layer (trafoDepth is equal to 1) to a $2^{nd}$ layer (trafoDepth is equal to 2), because a transform block is always split by using a one-into-four rule and the minimum transform block size that may be used by the coder is 4, the transform block cannot be split into four 8×2 transform blocks, and therefore, in this case, the splitting direction is the horizontal direction and the value of interTUSplitDirection is set to 1, that is, the transform block is split into four 4×4 transform blocks along the horizontal direction.

Figure 7:
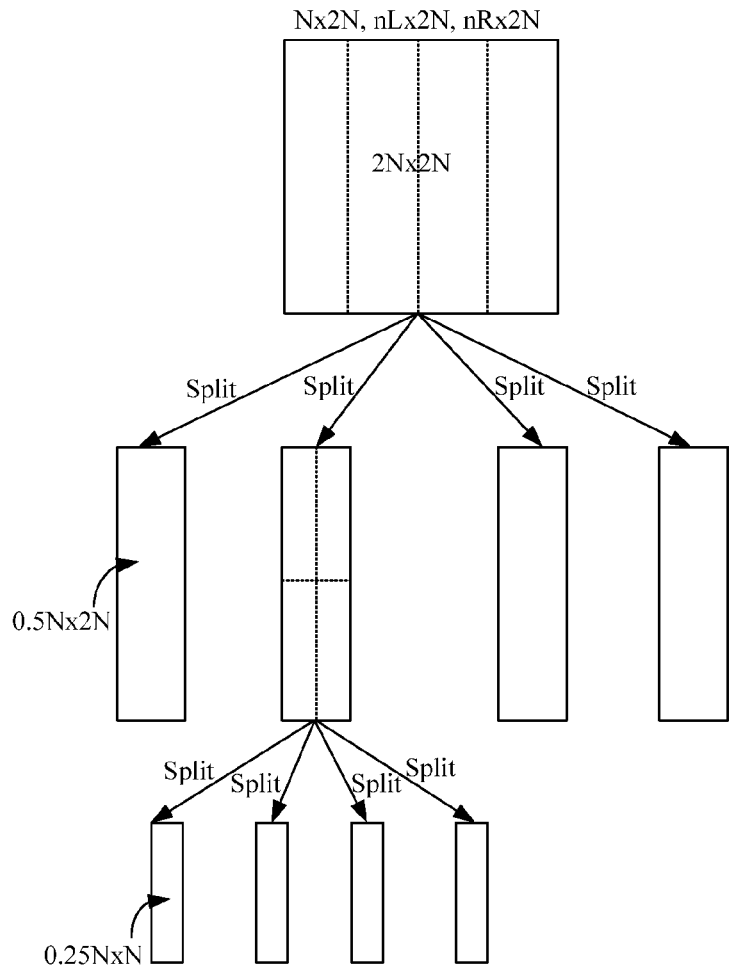

As shown in FIG. 7, the splitting manner of the image block is one of N×2N, nL×2N, and nR×2N, and the horizontal splitting manner is used by the image block. When the transform block is located in a $0^{th}$ layer (trafoDepth is equal to 0), a size of the transform bock is 16×16. When it is determined that the transform block needs to be split from the $0^{th}$ layer (trafoDepth is equal to 0) to a $1^{st}$ layer (trafoDepth is equal to 1), according to the preceding principle, in this case, the splitting direction is the horizontal direction and the value of interTUSplitDirection is 1 and then a size of a transform block in the $1^{st}$ layer is 4×16. When it is determined that a transform block needs to be split from the $1^{st}$ layer (trafoDepth is equal to 1) to a $2^{nd}$ layer (trafoDepth is equal to 2), because a transform block is always split by using a one-into-four rule and the minimum transform block size that may be used by the coder is 4, the transform block cannot be split into four 2×8 transform blocks, and therefore, in this case, the splitting direction is the vertical direction and the value of interTUSplitDirection is set to 0, that is, the transform block is split into four 4×4 transform blocks along the vertical direction.

503: Obtain position information of the current transform block according to the splitting direction parameter.

The position information of the transform block includes a position parameter of the transform block or a position parameter of a filtering boundary of the transform block.

In the method for acquiring position information of a transform block provided in this embodiment of the present invention, splitting direction information is obtained directly according to a splitting manner of an image block and a layer number, and then, size information of a transform block is coded according to the splitting direction information, thereby effectively reducing complexity of a coding process.

Figure 8:
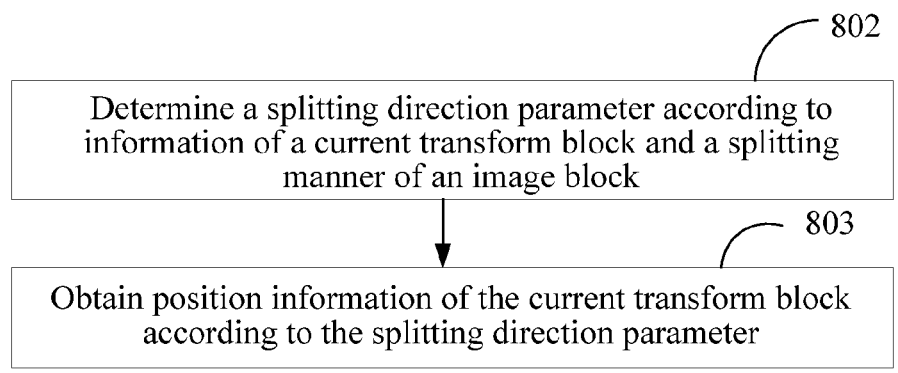
FIG. 8 is a method for acquiring position information of a transform block according to another embodiment of the present invention.

Referring to FIG. 8, an embodiment of the present invention further provides a method for acquiring position information of a transform block. The method includes:

801: Obtain a splitting manner of an image block.

Step 802: Obtain splitting direction information according to a numerical relationship between a width and a height of a transform block and the splitting manner of the image block; or obtain splitting direction information according to a numerical relationship between a width and a height of a transform block.

803: Obtain position information of a post-splitting transform block according to the splitting direction information.

Information of a current transform block includes a width of the current transform block, a height of the current transform block, a preset maximum transform block size, and a preset minimum transform block size.

The splitting direction information includes a splitting direction parameter. The splitting direction parameter is used to identify a splitting direction of the transform block.

In this embodiment of the present invention, the obtaining splitting direction information according to a numerical relationship between a width and a height of a transform block and the splitting manner of the image block; or the obtaining splitting direction information according to a numerical relationship between a width and a height of a transform block includes: when a size parameter of the current transform block is smaller than or equal to the preset maximum transform block size, the height of the current transform block is equal to the width of the current transform block, both the height and the width of the current transform block are greater than the preset minimum transform block size, and the image block is split into two prediction blocks along a vertical direction, it may be known that in this case the current transform block is equivalent to the following described in step 502: when a splitting layer number of the current transform block is 0 and the image block is split into two prediction blocks along the vertical direction, the splitting direction parameter is set to 1, that is, interTUSplitDirection is equal to 1. When a size parameter of the current transform block is smaller than or equal to the preset maximum transform block size, the height of the current transform block is equal to the width of the current transform block, both the height and the width of the current transform block are greater than the preset minimum transform block size, and the image block is split into two prediction blocks along a horizontal direction, it may be known that in this case the current transform block is equivalent to the following described in step 502: when a splitting layer number of the current transform block is 0 and the image block is split into two prediction blocks along the horizontal direction, the splitting direction parameter is set to 0, that is, interTUSplitDirection is equal to 0. When the width of the current transform block is not equal to the height of the current transform block and both the width and the height of the current transform block are greater than the preset minimum transform block size, it may be known that the width and the height of the current transform block may be further split into half of the width and half of the height of the current transform block and the splitting direction parameter is set to 2, that is, a value of interTUSplitDirection is 2. When the height of the current transform block is equal to the preset minimum size and the width of the current transform block is greater than the height of the current transform block, the splitting direction parameter is set to 1, that is, a value of interTUSplitDirection is 1. When the width of the current transform block is equal to the preset minimum size and the width of the current transform block is smaller than the height of the current transform block, the splitting direction parameter is set to 0, that is, a value of interTUSplitDirection is 0; a value of the size parameter of the current transform block is equal to an average value of the height of the current transform block and the width of the current transform block.

The following gives an explanation with reference to a specific example.

As shown in FIG. 6, a splitting manner of an image block is 2N×N, 2N×nU, or 2N×nD, a size of an image block is 16×16, a preset maximum transform block size is 16, and a preset minimum transform block size is 4. It is assumed that a width and a height of a transform block are represented by using parameters log 2TrafoHeight and log 2TrafoWidth. A relationship between the height of the transform block and log 2TrafoHeight is as follows: height of the transform block=1<<log 2TrafoHeight; and a relationship between the width of the transform block and log 2TrafoWidth is as follows: Width of the transform block=1<<log 2TrafoWidth. In addition, a size parameter of the transform block may also be represented by using log 2TrafoSize. A relationship between log 2TrafoSize, log 2TrafoHeight, and log 2TrafoWidth is log 2TrafoSize=(log 2TrafoHeight+log 2TrafoHeight)>>1.

In the preceding arithmetic operation, "<<" represents a left shift operation, 1<<log 2TrafoHeight is equivalent to a $2^{log\ 2\ TrafoHeight}$ operation, 1<<log 2TrafoWidth is equivalent to a $2^{log\ 2\ TrafoWidth}$ operation, and 1<<log 2TrafoSize is equivalent to a $2^{log\ 2\ TrafoSize}$ operation; and ">>" represents a right shift operation, (log 2TrafoHeight+log 2TrafoHeight)>>1 is equivalent to an operation of (log 2TrafoHeight+log 2TrafoHeight)/2, and the following is the same.

It can be known from the preceding description that, log 2TrafoHeight, log 2TrafoWidth, and log 2TrafoSize represent a size of the transform block in an exponential form. Therefore, when the transform block is split into smaller sub-transform blocks, a change to the size of the transform block may be reflected by addition or subtraction of numerical values of the parameters log 2TrafoHeight, log 2TrafoWidth, and log 2TrafoSize. For example, when a size of a current transform block is 16×16, a value of log 2TrafoHeight is 4, a value of log 2TrafoWidth is 4, and a value of log 2TrafoSize is 4. When the transform block is split into 16×4 sub-transform blocks, the size changes to 16×4. In this case, the value of log 2TrafoWidth does not change and is still 4, the value of log 2TrafoHeight changes to 2 (4−2), and the value of log 2TrafoSize changes to 3 (4−1, that is, an average value of 4 and 2).

An initial size of a transform block used by the image block is consistent with a size of the image block. That is, both the width and the height of the current transform block are 16. In this case, the value of log 2TrafoHeight is 4, the value of log 2TrafoWidth is 4, and the value of log 2TrafoSize is 4. In this case, when the current transform block is further split into smaller transform blocks, because both the width and the height of the current transform block are 16 (log 2TrafoHeight is equal to log 2TrafoWidth) and the splitting manner of the image block is 2N×N, 2N×nU, or 2N×nD, it may be known that the transform block is further split into four transform blocks whose width is 16 (the value of log 2TrafoWidth does not change) and whose height is 4 (the value of log 2TrafoHeight decrements by 2) along a vertical direction and a value of a splitting parameter interTUSplitDirection is set to 0. When the width of transform blocks obtained through further splitting is 16 and the height is 4, because the height of the transform blocks is equal to the preset minimum transform block size (that is, log 2TrafoHeight is equal to 2), in this case, the transform blocks cannot be further split into smaller transform blocks along the vertical direction or along both a horizontal direction and the vertical direction. In this case, each transform block may be further split into four transform blocks whose width and height are both 4 along the horizontal direction, and the value of the splitting parameter interTUSplitDirection is set to 1.

In the preceding step of determining whether the width or the height of the transform block is equal to the preset minimum transform block size, an average value (log 2TrafoSize) of the width and the height of the transform block may also be used for the determination. In the preceding method, a width (or height) of a post-splitting transform block is one fourth of a width (or height) of a pre-splitting transform block but a height (or width) of the post-splitting transform block does not change. That is, a value of log 2TrafoWidth or log 2TrafoHeight of the post-splitting transform block is a value of log 2TrafoWidth or log 2TrafoHeight of the pre-splitting transform block minus 2 but a value of log 2TrafoHeight (or log 2TrafoWidth) of the post-splitting transform block does not change. It may be known that, when the value of log 2TrafoHeight is not equal to that of log 2TrafoWidth, the value of log 2TrafoSize is always greater than a smallest value of log 2TrafoHeight and log 2TrafoWidth plus 1. Therefore, when the value of log 2TrafoSize is equal to the preset minimum transform block size plus 1, a value of one parameter of log 2TrafoHeight and log 2TrafoWidth is surely equal to the preset minimum transform block size; and a parameter whose value is equal to the preset minimum transform block size may be known through a numerical relationship (greater than, equal to, or smaller than) between log 2TrafoHeight and log 2TrafoWidth.

Further, if the maximum transform block size is set in a coding and decoding system, a condition for determining relationships between the width of the transform block, the height of the transform block, an average value of the width of the transform block and the height of the transform block, and the preset maximum transform block size needs to be added in the preceding determining method. When the size of the transform block exceeds the preset maximum transform block size, the transform block should be split into transform blocks of a smaller size.

Because a size of a post-splitting transform block and the number of post-splitting transform blocks may be determined according to a splitting direction, a position of a transform block may be further obtained; and because a filtering operation needs to be performed on a boundary of a transform block, a position of a filtering boundary of the transform block may be obtained according to the splitting direction.

When the splitting direction of the transform block is a vertical splitting direction or the splitting direction parameter is 0, because post-splitting transform blocks are arranged along the vertical direction, horizontal coordinate values of the post-splitting transform blocks are the same as a horizontal coordinate value of the transform block, and a vertical coordinate value of at least one of the post-splitting transform blocks is different from a vertical coordinate value of the transform block. When the splitting direction of the transform block is a vertical splitting direction or the splitting direction parameter is 0, because post-splitting transform blocks are arranged along the vertical direction, horizontal coordinate values of filtering boundaries of the post-splitting transform blocks are the same as a horizontal coordinate value of a filtering boundary of the transform block, and a vertical coordinate value of a filtering boundary of at least one of the post-splitting transform blocks is different from a vertical coordinate value of the filtering boundary of the transform block. When the splitting direction of the transform block is a horizontal splitting direction or the splitting direction parameter is 1, because post-splitting transform blocks are arranged along the horizontal direction, vertical coordinate values of the post-splitting transform blocks are the same as a vertical coordinate value of the transform block, and a horizontal coordinate value of at least one of the post-splitting transform blocks is different from a horizontal coordinate value of the transform block. When the splitting direction of the transform block is a horizontal splitting direction or the splitting direction parameter is 1, because post-splitting transform blocks are arranged along the horizontal direction, vertical coordinate values of filtering boundaries of the post-splitting transform blocks are the same as a vertical coordinate value of a filtering boundary of the transform block, and a horizontal coordinate value of a filtering boundary of at least one of the post-splitting transform blocks is different from a horizontal coordinate value of the filtering boundary of the transform block. When the splitting direction of the transform block is a horizontal and vertical splitting direction or the splitting direction parameter is 2, because post-splitting transform blocks are arranged along the horizontal and vertical direction, a horizontal coordinate value of at least one of the post-splitting transform blocks is different from a horizontal coordinate value of the transform block, and a vertical coordinate value of the at least one of the post-splitting transform blocks is different from a vertical coordinate value of the transform block. When the splitting direction of the transform block is a horizontal and vertical splitting direction or the splitting direction parameter is 2, because post-splitting transform blocks are arranged along the horizontal and vertical direction, a horizontal coordinate value of a filtering boundary of at least one of the post-splitting transform blocks is different from a horizontal coordinate value of a filtering boundary of the transform block, and a vertical coordinate value of the filtering boundary of the at least one of the post-splitting transform blocks is different from a vertical coordinate value of the filtering boundary of the transform block.

In this embodiment of the present invention, the horizontal coordinate value of the transform block refers to a horizontal coordinate value of a specific position of the transform block, the vertical coordinate value of the transform block refers to a vertical coordinate value of a specific position of the transform block, the horizontal coordinate value of the filtering boundary of the transform block refers to a horizontal coordinate value of a specific position of the transform block, and the vertical coordinate value of the filtering boundary of the transform block refers to a vertical coordinate value of a specific position of the transform block. The specific position may be an upper left corner, an upper right corner, a lower left corner, a lower right corner, a central point, or the like of the transform block.

Specifically, it is assumed that coordinate values of an upper left corner of the current transform block are (xm0, ym0), and coordinate values of upper left corners of four transform blocks obtained through splitting are (xn0, yn0), (xn1, xn1), (xn2, yn2), and (yn3, yn3), where xm0, xn0, xn1, xn2, and xn3 indicate horizontal coordinate values, and ym0, yn0, yn1, yn2, and yn3 indicate vertical coordinate values. It is assumed that the width of the current transform block is log 2TrafoWidth, and the height of the current transform block is log 2TrafoHeight.

When the value of interTUSplitDirection is 0, horizontal coordinate values of sub-transform blocks obtained through splitting do not change. Relationships between (xn0, yn0)/(xn1, yn1)/(xn2, yn2)/(yn3, yn3) and (xm0, ym0) are as follows:

xn0=xm0
yn0=ym0
xn1=xm0
yn1=ym0+1<<(log 2TrafoHeight−2)
xn2=xm0
yn2=ym1+1<<(log 2TrafoHeight−2)
xn3=xm0
yn3=ym2+1<<(log 2TrafoHeight−2)

When the value of interTUSplitDirection is 1, vertical coordinate values of the sub-transform blocks obtained through splitting do not change. Relationships between (yn0, yn0)/(yn1, yn1)/(yn2, yn2)/(yn3, yn3) and (xm0, ym0) are as follows:

xn0=xm0
yn0=ym0
xn1=xm0+1<<(log 2TrafoWidth−2)
yn1=ym0
xn2=xm0+1<<(log 2TrafoWidth−2)
yn2=ym1
xn3=xm0+1<<(log 2TrafoWidth−2)
yn3=ym2

When the value of interTUSplitDirection is 2, relationships between (yn0, yn0)/(yn1, yn1)/(yn2, yn2)/(yn3, yn3) and (xm0, ym0) are as follows:

xn0=xm0
yn0=ym0
xn1=xm0+1<<(log 2TrafoWidth−2)
yn1=ym0
xn2=xm0
yn2=ym1+1<<(log 2TrafoHeight−2)
xn3=xm0+1<<(log 2TrafoWidth−2)
yn3=ym2+1<<(log 2TrafoHeight−2)

The preceding method of calculating (yn0, yn0), (yn1, yn1), (yn2, yn2), and (yn3, yn3) according to the value of interTUSplitDirection may be further simplified into the following form:

When the value of interTUSplitDirection is 2, relationships between (yn0, yn0)/(yn1, yn1)/(yn2, yn2)/(yn3, yn3) and (xm0, ym0) are as follows:

xn0=xm0
yn0=ym0
xn1=xm0+1<<(log 2TrafoWidth−2)
yn1=ym0
xn2=xm0 yn2=ym1+1<<(log 2TrafoHeight−2)
xn3=xm0+1<<(log 2TrafoWidth−2)
yn3=ym2+1<<(log 2TrafoHeight−2)

When the value of interTUSplitDirection is not 2, relationships between (yn0, yn0)/(yn1, yn1)/(yn2, yn2)/(yn3, yn3) and (xm0, ym0) are as follows:

xn0=xm0
yn0=ym0
xn1=xn0+((1<<log 2TrafoWidth)>>2)*interTUSplitDirection
yn1=yn0+((1<<log 2TrafoHeight)>>2)*(1−interTUSplitDirection)
xn2=xn1+((1<<log 2TrafoWidth)>>2)*interTUSplitDirection
yn2=yn1+((1<<log 2TrafoHeight)>>2)*(1−interTUSplitDirection)
xn3=xn2+((1<<log 2TrafoWidth)>>2)*interTUSplitDirection
yn3=yn2+((1<<log 2TrafoHeight)>>2)*(1−interTUSplitDirection)

A position of a filtering boundary of a post-splitting transform block is consistent with a position of the transform block, and details are not repeatedly described herein.

Figure 9:
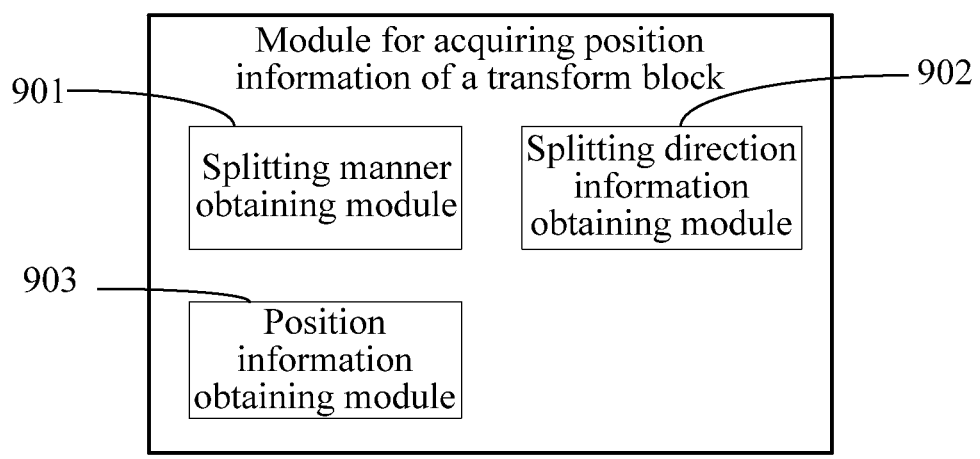
FIG. 9 is a schematic diagram of a module for acquiring position information of a transform block according to an embodiment of the present invention.

Accordingly, referring to FIG. 9, an embodiment of the present invention further provides a module for acquiring position information of a transform block, where the module is configured to execute the preceding steps 501 to 503.

In FIG. 9, the module for acquiring position information of a transform block provided in this embodiment of the present invention includes: a splitting manner obtaining module 901, configured to obtain a splitting manner of an image block; a splitting direction information obtaining module 902, configured to obtain splitting direction information according to the splitting manner of the image block and a splitting layer number of a transform block; and a position information obtaining module 903, configured to obtain position information of a post-splitting transform block according to the splitting direction information.

For a specific working method of each module described in the foregoing, reference may be made to the preceding description, and details are not repeatedly described herein.

Certainly, with reference to steps 801 to 803, each module in the module for acquiring position information of a transform block provided in this embodiment of the present invention may include: a splitting manner obtaining module 901, configured to obtain a splitting manner of an image block; a splitting direction information obtaining module 902, configured to obtain splitting direction information according to a numerical relationship between a width and a height of a transform block and the splitting manner of the image block, or obtain splitting direction information according to a numerical relationship between a width and a height of a transform block; and a position information obtaining module 903, configured to obtain position information of a post-splitting transform block according to the splitting direction information.

Similarly, for a specific working method of each module described in the foregoing, reference may be made to the preceding description, and details are not repeatedly described herein.

A person of ordinary skill in the art may understand that all or a part of the steps in the methods of the foregoing embodiments may be implemented by a program instructing relevant hardware. The program may be stored in a computer readable storage medium, such as a read-only memory, a magnetic disk, or an optical disk.

A method and a device for acquiring position information of a transform block provided in the embodiments of the present invention are described in detail in the foregoing. Specific examples are used in this specification for illustrating principles and implementation manners of the present invention. The description of the foregoing embodiments is merely used to help understanding of the methods and core ideas of the present invention. Meanwhile, a person of ordinary skill in the art may make variations to the specific implementation manners and application scopes according to the ideas of the present invention. In conclusion, the content of this specification should not be construed as a limitation on the present invention.

What is claimed is:

1. A method for acquiring position information of a transform block, comprising:
   obtaining a splitting manner of an image block;
   obtaining a splitting layer number of a transform block;
   obtaining a splitting direction information of the transform block according to the splitting manner of the image block and the splitting layer number; and
   obtaining position information of a post-splitting transform block according to the splitting direction information.

2. The method according to claim 1, wherein the splitting direction information comprises a splitting direction parameter, and wherein the splitting direction parameter is used to identify the splitting direction of the transform block.

3. The method according to claim 2, wherein obtaining the splitting direction information according to the splitting manner of the image block and the splitting layer number of the transform block comprises:
   when the splitting layer number of the transform block is zero and the splitting manner of the image block is a horizontal splitting manner, determining that the splitting direction parameter is a first parameter value;
   when the splitting layer number of the transform block is zero and the splitting manner of the image block is a vertical splitting manner, determining that the splitting direction parameter is a second parameter value;
   when the splitting layer number of the transform block is greater than zero and the splitting manner of the image block is a vertical splitting manner or a horizontal splitting manner, and both a width and a height of the transform block are greater than a preset minimum size or a size parameter of the transform block is greater than the preset minimum size plus one, determining that the splitting direction parameter is a third parameter value;
   when the splitting layer number of the transform block is greater than zero and the splitting manner of the image block is a vertical splitting manner, and a width of the transform block is equal to a preset minimum size, determining that the splitting direction parameter is a first parameter value;
   when the splitting layer number of the transform block is greater than zero and the splitting manner of the image block is a horizontal splitting manner, and a height of the transform block is equal to a preset minimum size, determining that the splitting direction parameter is a second parameter value; and
   determining that a value of the size parameter of the transform block is equal to an average value of the height of the transform block and the width of the transform block.

4. The method according to claim 1, wherein the splitting direction information comprises a splitting direction of the transform block, and wherein the splitting direction of the transform block comprises a horizontal splitting direction, a vertical splitting direction, and a horizontal and vertical splitting direction.

5. The method according to claim 4, wherein the obtaining splitting direction information according to the splitting manner of the image block and a splitting layer number of a transform block comprises:

when the splitting layer number of the transform block is zero and the splitting manner of the image block is a vertical splitting manner, determining that the splitting direction of the transform block is the horizontal splitting direction;

when the splitting layer number of the transform block is zero and the splitting manner of the image block is a horizontal splitting manner, determining that the splitting direction of the transform block is the vertical splitting direction;

when the splitting layer number of the transform block is greater than zero and the splitting manner of the image block is a vertical splitting manner or a horizontal splitting manner, and both a width and a height of the transform block are greater than a preset minimum size or a size parameter of the transform block is greater than the preset minimum size plus one, determining that the splitting direction of the transform block is the horizontal and vertical splitting direction;

when the splitting layer number of the transform block is greater than zero and the splitting manner of the image block is a vertical splitting manner, and a width of the transform block is equal to a preset minimum size, determining that the splitting direction of the transform block is the vertical splitting direction;

when the splitting layer number of the transform block is greater than zero and the splitting manner of the image block is a horizontal splitting manner, and a height of the transform block is equal to a preset minimum size, determining that the splitting direction of the transform block is the horizontal splitting direction; and determining that a value of the size parameter of the transform block is equal to an average value of the height of the transform block and the width of the transform block.

6. The method according to claim 1, wherein the position information of the transform block comprises a position parameter of the transform block or a position parameter of a filtering boundary of the transform block.

7. The method according to claim 6, wherein the position parameter of the transform block comprises a horizontal coordinate value of the transform block and a vertical coordinate value of the transform block, and wherein the position parameter of the filtering boundary of the transform block comprises a horizontal coordinate value of the filtering boundary of the transform block and a vertical coordinate value of the filtering boundary of the transform block.

8. The method according to claim 7, wherein when a splitting direction of the transform block is a vertical splitting direction or a splitting direction parameter is a first parameter value, horizontal coordinate values of the post-splitting transform blocks are the same as the horizontal coordinate value of the transform block, and a vertical coordinate value of at least one of the post-splitting transform blocks is different from the vertical coordinate value of the transform block, wherein when a splitting direction of the transform block is a vertical splitting direction or a splitting direction parameter is a first parameter value, horizontal coordinate values of filtering boundaries of the post-splitting transform blocks are the same as the horizontal coordinate value of the filtering boundary of the transform block, and a vertical coordinate value of a filtering boundary of at least one of the post-splitting transform blocks is different from the vertical coordinate value of the filtering boundary of the transform block, wherein when the splitting direction of the transform block is a horizontal splitting direction or the splitting direction parameter is a second parameter value, vertical coordinate values of the post-splitting transform blocks are the same as the vertical coordinate value of the transform block, and a horizontal coordinate value of at least one of the post-splitting transform blocks is different from the horizontal coordinate value of the transform block, wherein when the splitting direction of the transform block is the horizontal splitting direction or the splitting direction parameter is the second parameter value, the vertical coordinate values of filtering boundaries of the post-splitting transform blocks are the same as the vertical coordinate value of the filtering boundary of the transform block, and the horizontal coordinate value of the filtering boundary of at least one of the post-splitting transform blocks is different from the horizontal coordinate value of the filtering boundary of the transform block;

wherein when either the splitting direction of the transform block is the horizontal splitting direction and the vertical splitting direction or the splitting direction parameter is a third parameter value, the horizontal coordinate value of at least one of the post-splitting transform blocks is different from the horizontal coordinate value of transform block, and the vertical coordinate value of the at least one of the post-splitting transform blocks is different from the vertical coordinate value of the transform block, and wherein when either the splitting direction of the transform block is the horizontal splitting direction and the vertical splitting direction or the splitting direction parameter is the third parameter value, the horizontal coordinate value of a filtering boundary of at least one of the post-splitting transform blocks is different from the horizontal coordinate value of the filtering boundary of the transform block, and the vertical coordinate value of the filtering boundary of the at least one of the post-splitting transform blocks is different from the vertical coordinate value of the filtering boundary of the transform block.

9. A method for acquiring position information of a transform block, comprising:

obtaining a splitting manner of an image block;

either obtaining splitting direction information of a transform block according to a numerical relationship between a width and a height of the transform block and the splitting manner of the image block, or obtaining a splitting direction information of the transform block according to a numerical relationship between the width and the height of the transform block; and obtaining position information of a post-splitting transform block according to the splitting direction information.

10. The method according to claim 9, wherein the numerical relationship comprises "greater than", "equal to", or "smaller than".

11. The method according to claim 9, wherein obtaining the splitting direction information according to a numerical relationship between the width and the height of the transform block and the splitting manner of the image block comprises:
  when the height of the transform block is equal to the width of the transform block and the splitting manner of the image block is a horizontal splitting manner, determining that the splitting direction of the transform block is a vertical splitting direction;
  when the height of the transform block is equal to the width of the transform block and the splitting manner of the image block is a vertical splitting manner, determining that the splitting direction of the transform block is a horizontal splitting direction; and
  when the height of the transform block is not equal to the width of the transform block, determining that the splitting direction of the transform block is a horizontal and vertical splitting direction.

12. The method according to claim 9, wherein obtaining the splitting direction information according to a numerical relationship between a width and a height of a transform block and the splitting manner of the image block comprises:
  determining that the splitting direction of the transform block is the horizontal splitting direction when a size parameter of the transform block is smaller than or equal to a preset maximum transform block size, the height of the transform block is equal to the width of the transform block, both the height and the width of the transform block are greater than a preset minimum transform block size or the size parameter of the transform block is greater than a preset minimum transform block size plus one, and the splitting manner of the image block is a vertical splitting manner;
  determining that the splitting direction of the transform block is the vertical splitting direction when the size parameter of the transform block is smaller than or equal to the preset maximum transform block size, the height of the transform block is equal to the width of the transform block, both the height and the width of the transform block are greater than the preset minimum transform block size or the size parameter of the transform block is greater than the preset minimum transform block size plus one, and the splitting manner of the image block is a horizontal splitting manner;
  determining that the splitting direction of the transform block is the horizontal and vertical splitting direction when the width of the transform block is not equal to the height of the transform block, both the height and the width of the transform block are greater than the preset minimum transform block size or the size parameter of the transform block is greater than the preset minimum transform block size plus one; and
  determining that a value of the size parameter of the transform block is equal to an average value of the height of the transform block and the width of the transform block.

13. The method according to claim 9, wherein the obtaining splitting direction information according to a numerical relationship between a width and a height of a transform block comprises:
  when the height of the transform block is equal to a preset minimum size and the width of the transform block is greater than the height of the transform block, determining that the splitting direction of the transform block is the horizontal splitting direction; and
  when the width of the transform block is equal to the preset minimum size and the width of the transform block is smaller than the height of the transform block, determining that the splitting direction of the transform block is the vertical splitting direction.

14. The method according to claim 9, wherein the splitting direction information comprises a splitting direction parameter, and wherein the splitting direction parameter is used to identify a splitting direction of the transform block.

15. The method according to claim 14, wherein obtaining splitting direction information according to a numerical relationship between the width and the height of the transform block and the splitting manner of the image block comprises:
  when the height of the transform block is equal to the width of the transform block and the splitting manner of the image block is a horizontal splitting manner, determining that the splitting direction parameter is a first parameter value;
  when the height of the transform block is equal to the width of the transform block and the splitting manner of the image block is vertical splitting manner, determining that the splitting direction parameter is a second parameter value; and
  when the height of the transform block is not equal to the width of the transform block, determining that the splitting direction parameter is a third parameter value.

16. The method according to claim 14, wherein obtaining the splitting direction information according to the numerical relationship between the width and the height of the transform block and the splitting manner of the image block comprises:
  determining that the splitting direction parameter is the second parameter value when a size parameter of the transform block is smaller than or equal to a preset maximum transform block size, the height of the transform block is equal to the width of the transform block, either both the height and the width of the transform block are greater than a preset minimum transform block size or the size parameter of the transform block is greater than a preset minimum transform block size plus one, and the splitting manner of the image block is a vertical splitting manner;
  determining that the splitting direction parameter is the first parameter value when the size parameter of the transform block is smaller than or equal to a preset maximum transform block size, the height of the transform block is equal to the width of the transform block, either both the height and the width of the transform block are greater than a preset minimum transform block size or the size parameter of the transform block is greater than a preset minimum transform block size plus one, and the splitting manner of the image block is a horizontal splitting manner;
  determining that the splitting direction parameter is the third parameter value when the width of the transform block is not equal to the height of the transform block, and either both the height and the width of the transform block are greater than a preset minimum transform block size or the size parameter of the transform block is greater than the preset minimum transform block size plus one; and
  a value of the size parameter of the transform block is equal to an average value of the height of the transform block and the width of the transform block.

17. The method according to claim 14, wherein obtaining the splitting direction information according to the numerical relationship between the width and the height of the transform block comprises:
  when the height of the transform block is equal to a preset minimum size and the width of the transform block is greater than the height of the transform block, determining that the splitting direction parameter is a second parameter value; and when the width of the transform block is equal to a preset minimum size and the width of the transform block is smaller than the height of the transform block, determining that the splitting direction parameter is a first parameter value.

18. The method according to claim 15, wherein the first parameter value is zero, the second parameter value is one, and the third parameter value is two.

19. The method according to claim 9, wherein the position information of the transform block comprises a position parameter of the transform block or a position parameter of a filtering boundary of the transform block.

20. The method according to claim 19, wherein the position parameter of the transform block comprises a horizontal coordinate value of the transform block and a vertical coordinate value of the transform block, and wherein the position parameter of the filtering boundary of the transform block comprises a horizontal coordinate value of the filtering boundary of the transform block and a vertical coordinate value of the filtering boundary of the transform block.

21. The method according to claim 20, wherein when a splitting direction of the transform block is a vertical splitting direction or a splitting direction parameter is a first parameter value, horizontal coordinate values of the post-splitting transform blocks are the same as the horizontal coordinate value of the transform block, and a vertical coordinate value of at least one of the post-splitting transform blocks is different from the vertical coordinate value of the transform block;

wherein when the splitting direction of the transform block is the vertical splitting direction or the splitting direction parameter is the first parameter value, the horizontal coordinate values of filtering boundaries of the post-splitting transform blocks are the same as the horizontal coordinate value of the filtering boundary of the transform block, and a vertical coordinate value of a filtering boundary of at least one of the post-splitting transform blocks is different from the vertical coordinate value of the filtering boundary of the transform block;

wherein when the splitting direction of the transform block is a horizontal splitting direction or the splitting direction parameter is a second parameter value, vertical coordinate values of the post-splitting transform blocks are the same as the vertical coordinate value of the transform block, and the horizontal coordinate value of at least one of the post-splitting transform blocks is different from the horizontal coordinate value of the transform block;

wherein when the splitting direction of the transform block is the horizontal splitting direction or the splitting direction parameter is the second parameter value, the vertical coordinate values of filtering boundaries of the post-splitting transform blocks are the same as the vertical coordinate value of the filtering boundary of the transform block, and the horizontal coordinate value of a filtering boundary of at least one of the post-splitting transform blocks is different from the horizontal coordinate value of the filtering boundary of the transform block;

wherein when either the splitting direction of the transform block is the horizontal splitting direction and the vertical splitting direction or the splitting direction parameter is a third parameter value, the horizontal coordinate value of at least one of the post-splitting transform blocks is different from the horizontal coordinate value of transform block, and the vertical coordinate value of the at least one of the post-splitting transfoxiii blocks is different from the vertical coordinate value of the transform block; and wherein when either the splitting direction of the transform block is the horizontal splitting direction and the vertical splitting direction or the splitting direction parameter is a third parameter value, the horizontal coordinate value of the filtering boundary of at least one of the post-splitting transform blocks is different from the horizontal coordinate value of the filtering boundary of the transform block, and the vertical coordinate value of the filtering boundary of the at least one of the post-splitting transform blocks is different from the vertical coordinate value of the filtering boundary of the transform block.

22. A device, comprising:

a processor; and a physical memory configured to store instructions that when executed by the processor, cause the processor to acquire position information of a transform block by:
   obtaining a splitting manner of an image block;
   obtaining a splitting layer number of a transform block;
   obtaining a splitting direction information of the transform block according to the splitting manner of the image block and the splitting layer number; and
   obtaining position information of a post-splitting transform block according to the splitting direction information.

23. A device, comprising:

a processor; and a physical memory configured to store instructions that when executed by the processor, cause the processor to acquire position information of a transform block by:
   obtaining a splitting manner of an image block;
   either obtaining splitting direction information of a transform block according to a numerical relationship between a width and a height of the transform block and the splitting manner of the image block, or obtaining a splitting direction information of the transform block according to a numerical relationship between the width and the height of the transform block; and
   obtaining position information of a post-splitting transform block according to the splitting direction information.

* * * * *